(12) United States Patent
Lari

(10) Patent No.: US 9,089,115 B2
(45) Date of Patent: Jul. 28, 2015

(54) AQUARIUM SYSTEM

(71) Applicant: Nick Lari, Jacksonville, FL (US)

(72) Inventor: Nick Lari, Jacksonville, FL (US)

(*) Notice: Subject to any disclaimer, the term of this patent is extended or adjusted under 35 U.S.C. 154(b) by 273 days.

(21) Appl. No.: 13/871,602

(22) Filed: Apr. 26, 2013

(65) Prior Publication Data

US 2013/0284107 A1    Oct. 31, 2013

Related U.S. Application Data

(60) Provisional application No. 61/639,323, filed on Apr. 27, 2012.

(51) Int. Cl.
*A01K 63/00* (2006.01)
*A01K 63/04* (2006.01)

(52) U.S. Cl.
CPC ............. *A01K 63/006* (2013.01); *A01K 63/045* (2013.01)

(58) Field of Classification Search
CPC ...... A01K 63/00; A01K 63/04; A01K 63/006
USPC .................. 119/245, 247, 248, 253, 259, 269
See application file for complete search history.

(56) References Cited

U.S. PATENT DOCUMENTS

| | | | |
|---|---|---|---|
| 4,082,062 A | | 4/1978 | Rodemeyer |
| 4,175,513 A | * | 11/1979 | Roehrick ....................... 119/246 |
| 4,516,529 A | | 5/1985 | Lotito et al. |
| 5,042,425 A | * | 8/1991 | Frost, Jr. ....................... 119/246 |
| 5,282,438 A | | 2/1994 | McLaughlin |
| 6,067,937 A | | 5/2000 | Boschert |
| 6,187,394 B1 | * | 2/2001 | Johnson et al. ................. 428/13 |
| 6,308,659 B1 | | 10/2001 | Boschert |
| 6,532,898 B2 | | 3/2003 | Boschert |
| 6,641,718 B2 | | 11/2003 | Lari et al. |
| 2007/0277742 A1 | * | 12/2007 | Venezia ........................ 119/245 |

* cited by examiner

*Primary Examiner* — Monica Williams
(74) *Attorney, Agent, or Firm* — Thomas C. Saitta

(57) ABSTRACT

An aquarium system having a tank supported by a base, the base having a drawer that that retains the operational components of the filtration system. An overflow chute is positioned within the tank, the chute having an open top such that water from the tank may flow into the chute and into the drawer. The drawer has a receiving compartment located beneath the chute and a return compartment separated from the receiving compartment by a filter such that water is drawn through the filter and into the return compartment by a pump. The pump then delivers the filtered water from the return compartment into the tank through a conduit passing up through the chute. The filtration system is fully operational with the drawer closed or partially open.

19 Claims, 3 Drawing Sheets

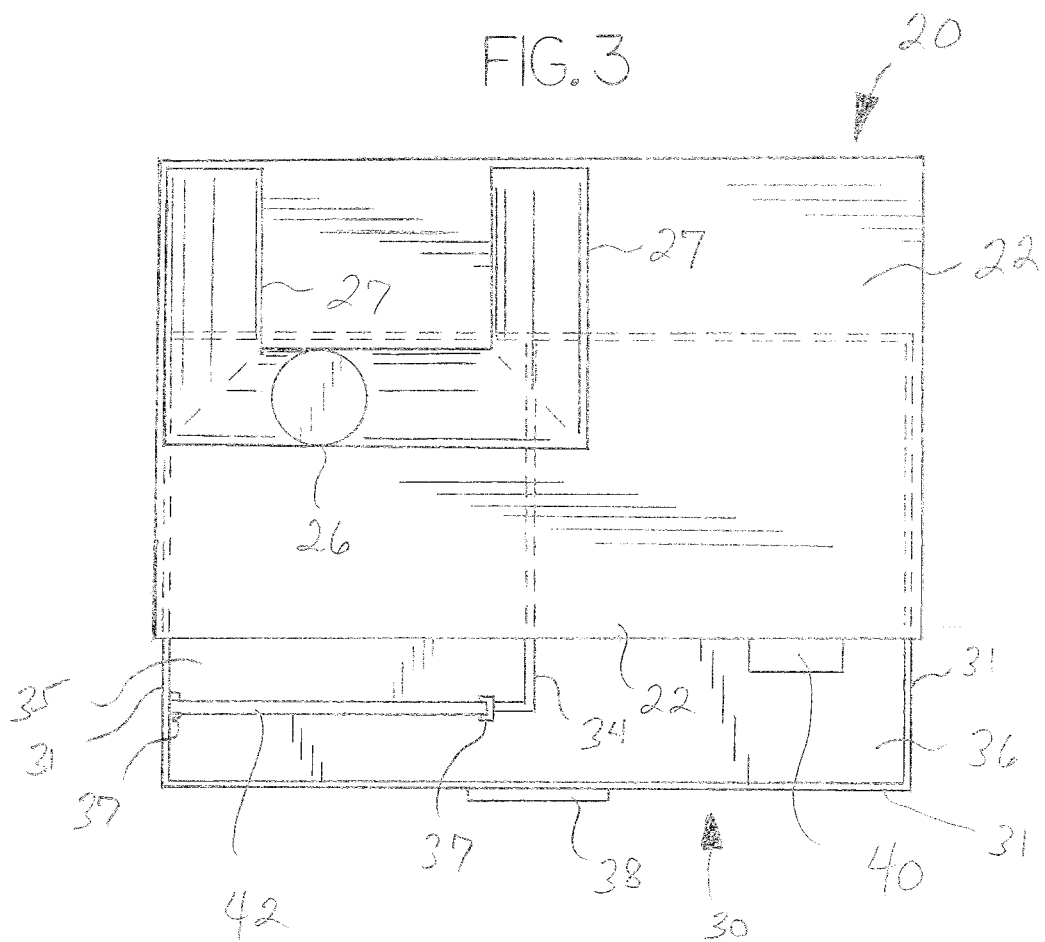

AQUARIUM SYSTEM

This application claims the benefit of U.S. Provisional Patent Application Ser. No. 61/639,323, filed Apr. 27, 2012.

BACKGROUND OF THE INVENTION

This invention relates generally to the field of aquarium systems comprising a tank for fish with accompanying water filtration systems, such as for example aquarium systems typically found in home or commercial settings for display of fresh or salt water fish.

Such systems typically comprise a water-retaining tank with an open top which may be provided with a cover, all or part of which is removable to allow access to the interior of the tank for feeding, cleaning, replenishment of water, introduction of new fish or plants, etc. A filtration system for withdrawing, treating and returning the aquarium water is required to maintain a suitable environment for the fish. With some known filtration systems some of the filtering components are located within the tank while other components are positioned externally to the tank, while in other filtration systems all of the operational components (pump, filter, cascade, etc.) are located outside of the tank with only suction and return conduits extending into the water, the operational components being hung onto the wall of the tank or located on a table, shelf or other support surface adjacent the tank. The operational components of a filtration system, in particular a pump or cascade, are noisy and unsightly, and it is also known to enclose such operational components within a housing or cabinet.

It is an object of this invention to provide an aquarium system wherein the operational components of the filtration system are hidden from view and acoustically isolated while remaining easily accessible for replacement of the filter and the like. It is a further object to provide the tank and operational components in combination such that the entire aquarium system appears as an integral device or assembly. It is a further object to provide such a system wherein the filters and pump may be easily and quickly replaced.

SUMMARY OF THE INVENTION

The invention is an aquarium system comprising a tank supported by a base, the base having a drawer or sliding tray that retains the main operational components of the filtration system, such as the filter and recirculation pump, the drawer defining a sump or reservoir to receive water from and return filtered water to the tank. The drawer sump is divided into a pre-filter receiving compartment and a post-filter return or pumping compartment. An overflow chute is positioned within the tank, the chute having an open top such that water at the surface of the tank flows into the chute, through an opening in the bottom of the tank and into the receiving compartment of the drawer. The water is drawn by a pump from the receiving compartment through one or more filters into the return or pumping compartment. The pump then delivers the filtered water from the return compartment back into the tank through a return conduit that passes up through the chute. The system is structured such that the drawer can be partially opened to provide access to the filter without the need to turn off the pump. In this manner a continuous filtering cycle may be maintained, the water flowing through the chute continues to fall into the receiving compartment.

In alternative language, the invention is an aquarium system comprising: a water retaining tank having walls, a bottom and a bottom opening; a base supporting said tank, said base having an at least partially open top and a front opening; a drawer positioned within said base and slidingly movable through said front opening, said drawer comprising a water receiving compartment and a water return compartment; a pump positioned within said return compartment, said pump delivering water from said return compartment into said tank through a return conduit extending upward through said bottom opening and said overflow chute; a filter vertically positioned in the forward portion of said drawer between said receiving compartment and said return compartment, whereby water in said receiving compartment is drawn through said filter and into said return compartment by said pump; stops to limit the amount of travel of said drawer relative to said base such that a portion of said receiving compartment remains below said overflow chute when said drawer is opened; an overflow chute comprising an open top having flow apertures, said overflow chute positioned within said tank over said bottom opening of said tank, whereby water in said tank flows into said overflow chute open top, into said overflow chute, through said tank bottom opening and into said receiving compartment; wherein with said drawer partially withdrawn from said base such that said filter is accessible for removal, water flowing through said overflow chute is received in said receiving compartment. And further, an invention with said base member further comprising a top surface having a base top opening and a channel extending to said base top opening, wherein said channel is positioned beneath said overflow chute, and/or wherein said drawer further comprises a window such that the level of water in said drawer is visible without opening said drawer.

BRIEF DESCRIPTION OF THE DRAWINGS

FIG. 3 is a top view of an alternative embodiment showing the drawer partially open relative to the base top surface.

DETAILED DESCRIPTION OF THE INVENTION

Figure 1:
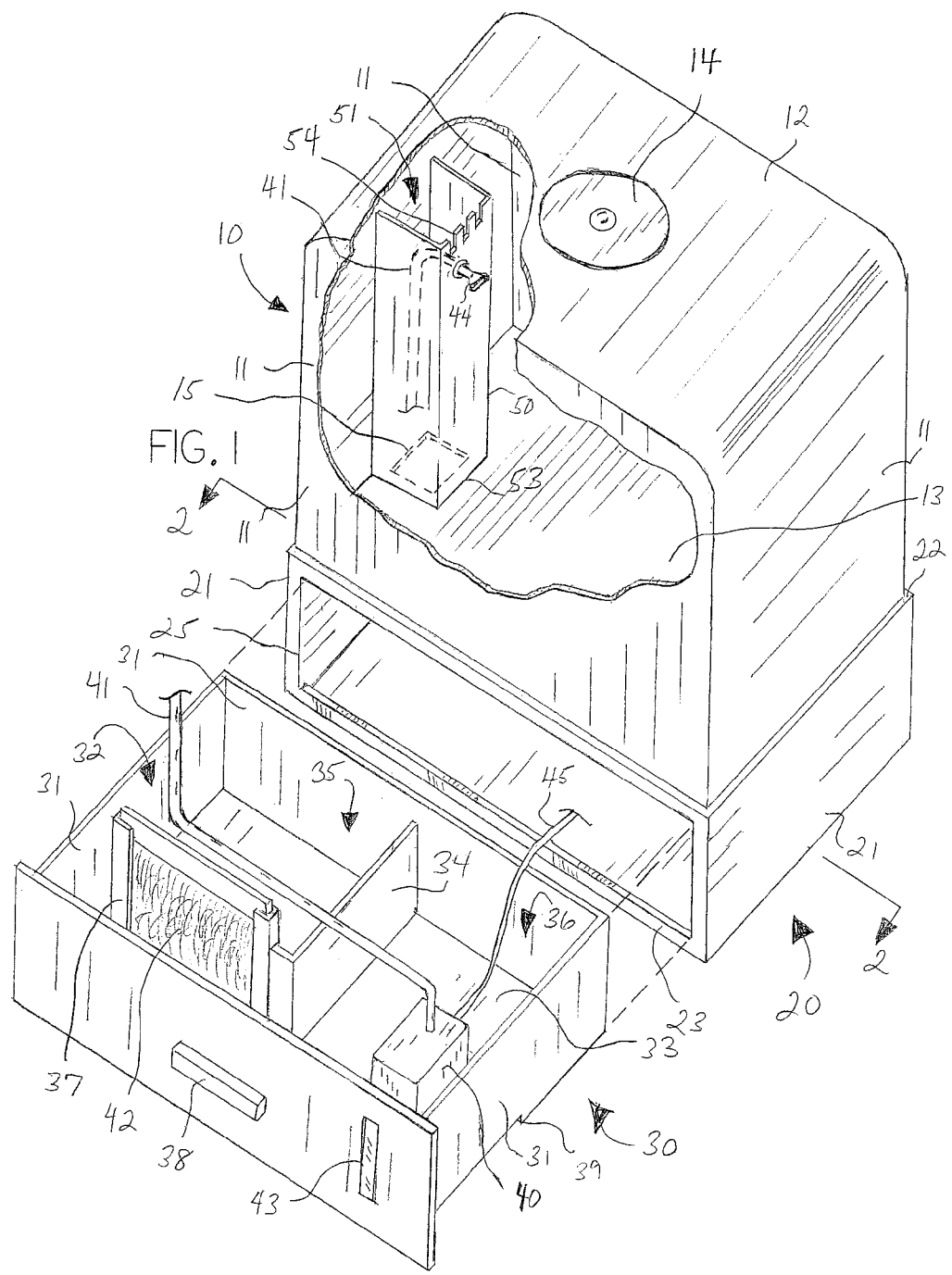
FIG. 1 is an expanded, partially exposed, perspective view of an embodiment of the aquarium system showing the drawer as fully removed from the base.
Figure 2:
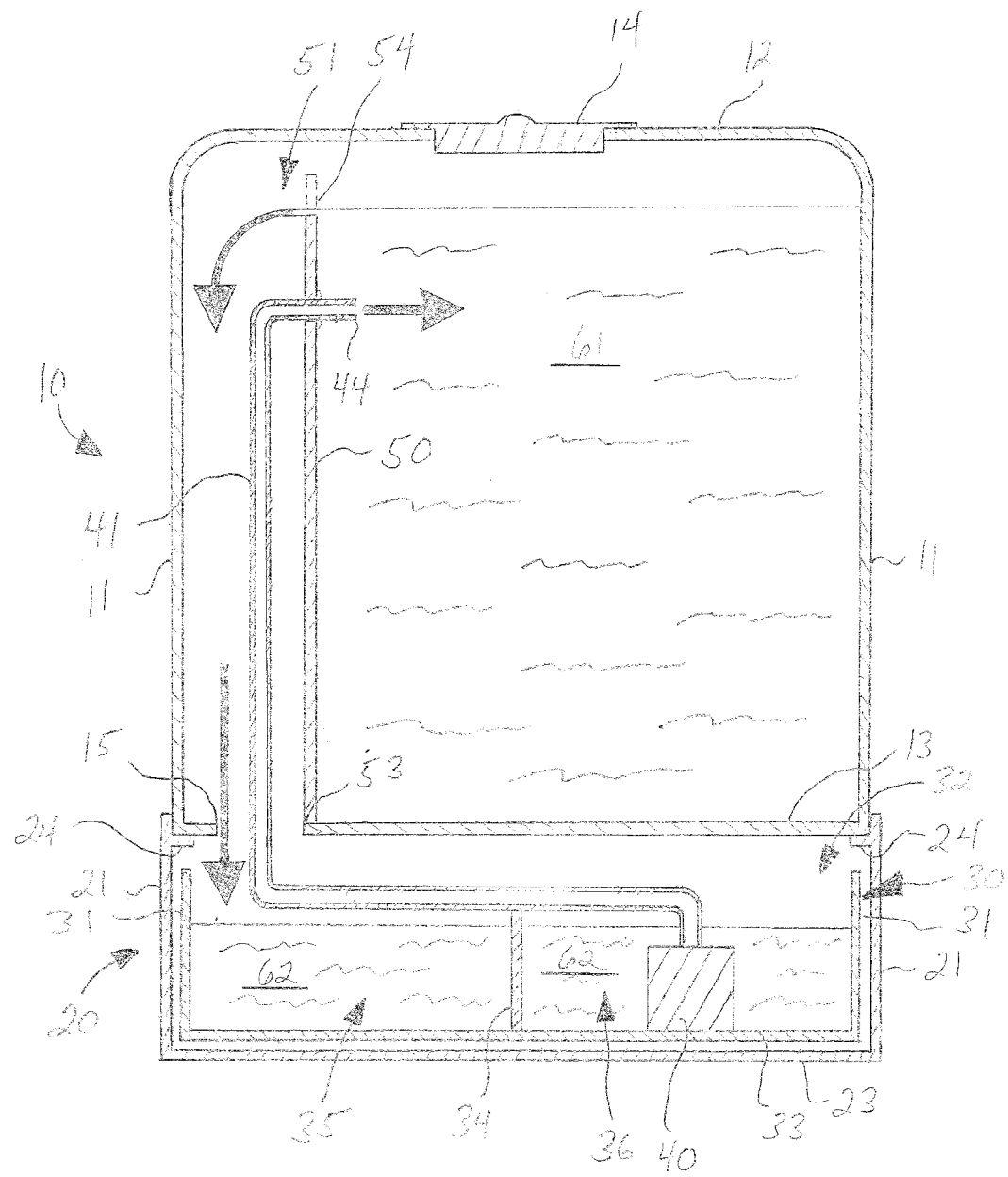
FIG. 2 is a cross-sectional view taken along line 2-2 of the aquarium system embodied in FIG. 1.

With reference to the drawing, the aquarium system is shown to comprise a water-retaining tank 10 supported by a base 20, the base 20 being provided with a sliding tray or drawer 30 that comprises or defines certain operational components and retains other operational components of the filtration system for the aquarium. The tank 10 comprises walls 11 and a bottom 13 joined or formed as a unitary structure to function as a water-retaining element or assembly. A top 12 may be provided as a cover, with the entire top 12 or a portion of the top 12 being removable to allow access to the interior of the tank 10. The size and configuration of the tank 10 may vary and may for example be square, rectangular, circular, etc. As shown in the drawings, the bottom 13, walls 11 and the top 12 of the tank 10 may be formed as a single element or joined to create a substantially closed assembly. The top 12 is apertured to receive a removable closure member 14. The closure member 14 may comprise a light assembly to illuminate the interior of the tank 10. A substantially closed system is preferred in order to limit evaporation of tank water 61. The walls 11 and top 12 may all be transparent, or some of the walls 11 and/or the top 12 may be non-transparent, colored, provided with decorative covering material, etc. The bottom 13 of the tank 10 is provided with a small opening 15 that is bounded by and communicates with a vertically-oriented, open-topped, drain or overflow chute 50 positioned within the tank 10, such that tank water 61 entering the overflow chute 50 passes through the opening 15 into the drawer 30. The overflow chute 50 may be a stand-alone structure or may comprise a wall structure joined to one of the walls 11 of the tank 10, as shown in the drawings.

The base 20 is the supporting member positioned beneath the aquarium tank 10 and comprises walls 21 and a bottom 23, preferably having a configuration generally corresponding to the configuration of the tank 10. The base 20 is preferably substantially open on top, but may further comprise a generally horizontal upper or top surface 22 that is at least partially open. The top surface 22 may be configured as a peripheral structure as shown in the drawings to comprise a tank-receiving interior flange, shoulder or plurality of support members 24 sized to receive and support the tank bottom 23 and tank walls 11. One wall 21 of the base 20 is provided with an opening 25 sized to receive the sliding tray or drawer 30. Preferably the majority of the top surface 22 is open, or alternatively a smaller opening 26 may be located in the top surface 22 that corresponds in location and communicates with the tank opening 15 and the overflow chute 50, such that tank water 61 flowing down through the overflow chute 50 passes directly into the receiving compartment 35 of the drawer 30.

The drawer 30 forms and defines certain operational components of the filtration system and retains other operational components. The drawer 30 comprises walls 31 and a bottom 33 formed as a single element or joined to define a water-retaining assembly. Preferably the drawer 30 has a fully open top 32. An interior wall 34 is located within the drawer 30 and, in combination with the one or more filter receptacles or housings 37 and the one or more water permeable filters 42, divides the drawer 30 into a receiving sump or compartment 35 and a return or pumping sump or compartment 36. The filter housing 37 is incorporated within, as a portion of, or located adjacent the end of the interior wall 34, the filter housing 37 receiving a filter 42 in a manner allowing the filter 42 to be easily removed and replaced as required. In the embodiment shown, the filter housing 37 is a slotted structure with an open top whereby a substantially planar filter 42 can be vertically inserted and removed from the filter housing 37, although it is to be understood that other types of filters, including cascades, may be incorporated within the filtration system. The location of the filter housing 37 is most preferably in the front half of the drawer 30 such that the filter 42 will be exposed when the drawer 30 is partially opened so that the filter 42 can be inspected, removed and replaced with the drawer 30 only partially opened and the filtration process on-going, as shown in FIG. 3.

The drawer 30 may be provided with a handle 38 for ease of opening and one or more stops 39 to initially limit the distance that the drawer 30 may be slidingly moved relative to the base 20. Alternatively, certain components of the filtration system, such as the return conduit 41 itself, may serve to limit travel of the drawer 30. The travel distance of the drawer 30 is initially limited such that a portion of the receiving compartment 35 remains under the drain chute 50 when the drawer 30 is partially opened, such that the drawer 30 can be partially opened to inspect or replace the filters 42 even with the filtration system in operation and tank water 61 flowing through the overflow chute 50. For example, with the overflow chute 50 and bottom opening 15 situated midway from front to back, the stops 39 are structured and positioned such that the rear wall 31 of the drawer 30 remains behind the bottom opening 15. The stops 39 may comprise tabs or corners on the drawer bottom 33, as shown in the drawings, such that the drawer 30 can be completely removed if necessary by tilting the drawer 30 such that the stops 39 clear the edge of the base front opening 25.

In systems wherein the overflow chute 50 and bottom opening 15 are located to the rear of the tank 10, the base top surface 22 is provided with a channel 27 disposed under the overflow chute 50, the channel 27 directing water to a base top opening 26 that directs tank water 61 into the receiving compartment 35. The base top opening 26 is located a sufficient distance away from the back wall, preferably near the midline, such that a portion of the receiving compartment 35 remains under the base top opening 26 when the drawer 30 is partially opened to access the filter 42. FIG. 3 illustrates an embodiment of a base top surface 26 having a pair of channels 27 directing water flow into the base top opening 26. With the structure as shown, the overflow chute 50 may be located in the middle of the back tank wall 11 or anywhere from the middle to the rear corner of the side tank wall 11. Different channel 27 configurations will account for other locations of the overflow chute 50.

The drawer 30 may be provided with a window 43 to allow the height of the sump water 62 within the drawer 30 to be ascertained without the need for opening the drawer 30. Heaters or other known treatment equipment may also be located in the drawer 30. Electrical cords will extend through slots or apertures in the base 20, and operational switches for the electrical components may be provided internally or externally as needed or desired.

A vertically oriented drain or overflow chute 50 is located within the tank 10, preferably formed as part of or against one of the walls 11. The overflow chute 50 comprises an open top 51, whereby tank water 61 within the tank 10 flows into the open top 51, passes down through the overflow chute 50, the tank opening 15 in the bottom 13 of tank 10, and into the receiving compartment 35 of the sump. The sump water 62 is then drawn through filter 42 and into the return compartment 36 by pump 40, which then pumps the filtered sump water 62 back into the tank 10 through return conduit 41, which may comprise a flexible plastic tube extending up through the overflow chute 50. The return conduit 41 may be provided with a nozzle 44 to better control or direct the output. The upper edge of the overflow chute 50 is preferably provided with flow apertures 54 that allow tank water 61 to enter but preclude large objects or fish from passing into the overflow chute 50.

The height of the overflow chute 50 or the height of the flow apertures 54 relative to the tank bottom 13 determines the maximum water level within the tank 10. The combined amount of tank water 61 and sump water 62 is greater than the capacity of the tank 10 such that with the tank water 61 at its maximum volume there is sufficient sump water 62 within the drawer 30 such that the pump 40 remains operational and the recirculation filtration process can be achieved. For example, in a tank 10 sized to retain 5 gallons of tank water 61, 6 total gallons of water may be provided in the aquarium system, such that 1 gallon of water resides in the drawer 30. Filtered sump water 62 introduced into the tank 10 by pump 40 causes the water level to rise and a portion of the tank water 61 to flow into the overflow chute 50 and into the receiving compartment 35, thereby replenishing the amount of filtered sump water 62 that has been delivered into the tank 10. In this manner a continuous filtration process can be maintained.

It is contemplated that equivalents and substitutions for certain elements set forth above may be obvious to those of skill in the art, and therefore the true scope and definition of the invention is to be as set forth in the following claims.

I claim:

1. An aquarium system comprising:
   a water retaining tank having walls, a bottom and a bottom opening;
   a base supporting said tank, said base having an at least partially open top and a front opening;
   a drawer positioned within said base and slidingly movable through said front opening, said drawer comprising a water receiving compartment and a water return compartment;
   a pump positioned within said return compartment, said pump delivering water from said return compartment into said tank through a return conduit;
   a filter positioned between said receiving compartment and said return compartment, whereby water in said receiving compartment is drawn through said filter and into said return compartment by said pump;
   an overflow chute comprising an open top, said overflow chute positioned within said tank over said bottom opening of said tank, whereby water in said tank flows into said overflow chute open top, into said overflow chute, through said tank bottom opening and into said receiving compartment;
   wherein with said drawer partially withdrawn from said base such that said filter is accessible for removal, water flowing through said overflow chute is received in said receiving compartment.

2. The system of claim 1, further comprising stops to limit the amount of travel of said drawer relative to said base such that a portion of said receiving compartment remains below said overflow chute when said drawer is opened.

3. The system of claim 1, wherein said return conduit extends upward through said bottom opening and said overflow chute.

4. The system of claim 1, wherein said filter is positioned vertically.

5. The system of claim 1, wherein said filter is positioned in the forward portion of said drawer.

6. The system of claim 1, wherein said overflow chute further comprises flow apertures.

7. The system of claim 1, wherein said drawer further comprises a window such that the level of water in said drawer is visible without opening said drawer.

8. The system of claim 1, said base member further comprising a top surface having a base top opening and a channel extending to said base top opening, wherein said channel is positioned beneath said overflow chute.

9. An aquarium system comprising:
   a tank, a base and a drawer, said tank positioned atop said base and said drawer slidingly received by said base;
   a water receiving compartment and water return compartment disposed within said drawer, said receiving compartment and said return compartment separated by a water permeable filter;
   a pump and a return conduit, said pump drawing water through said filter from said receiving compartment and into said return compartment, said pump further delivering water from said return compartment to said tank;
   a bottom opening in said tank;
   an overflow chute disposed within said tank and directing water from said tank through said bottom opening into said receiving compartment;
   whereby with water flowing through said overflow chute, said drawer is removable from said base a sufficient distance to allow removal of said filter while said receiving compartment continues to receive water from said overflow chute.

10. The system of claim 9, further comprising stops to limit the amount of travel of said drawer relative to said base such that a portion of said receiving compartment remains below said overflow chute when said drawer is opened.

11. The system of claim 9, wherein said return conduit extends upward through said bottom opening and said overflow chute.

12. The system of claim 9, wherein said filter is positioned vertically.

13. The system of claim 9, wherein said filter is positioned in the forward portion of said drawer.

14. The system of claim 9, wherein said overflow chute further comprises flow apertures.

15. The system of claim 9, wherein said drawer further comprises a window such that the level of water in said drawer is visible without opening said drawer.

16. The system of claim 9, said base member further comprising a top surface having a base top opening and a channel extending to said base top opening, wherein said channel is positioned beneath said overflow chute.

17. An aquarium system comprising:
   a water retaining tank having walls, a bottom and a bottom opening;
   a base supporting said tank, said base having an at least partially open top and a front opening;
   a drawer positioned within said base and slidingly movable through said front opening, said drawer comprising a water receiving compartment and a water return compartment;
   a pump positioned within said return compartment, said pump delivering water from said return compartment into said tank through a return conduit extending upward through said bottom opening and said overflow chute;
   a filter vertically positioned in the forward portion of said drawer between said receiving compartment and said return compartment, whereby water in said receiving compartment is drawn through said filter and into said return compartment by said pump;
   stops to limit the amount of travel of said drawer relative to said base such that a portion of said receiving compartment remains below said overflow chute when said drawer is opened;
   an overflow chute comprising an open top having flow apertures, said overflow chute positioned within said tank over said bottom opening of said tank, whereby water in said tank flows into said overflow chute open top, into said overflow chute, through said tank bottom opening and into said receiving compartment;
   wherein with said drawer partially withdrawn from said base such that said filter is accessible for removal, water flowing through said overflow chute is received in said receiving compartment.

18. The system of claim 17, said base member further comprising a top surface having a base top opening and a channel extending to said base top opening, wherein said channel is positioned beneath said overflow chute.

19. The system of claim 17, wherein said drawer further comprises a window such that the level of water in said drawer is visible without opening said drawer.

* * * * *